United States Patent
Lee et al.

(10) Patent No.: US 10,438,311 B2
(45) Date of Patent: Oct. 8, 2019

(54) WATERMARK EMBEDDING APPARATUS AND METHOD, AND WATERMARK DETECTING APPARATUS AND METHOD FOR 3D PRINTING ENVIRONMENT

(71) Applicant: Korea Advanced Institute of Science and Technology, Daejeon (KR)

(72) Inventors: Heung-Kyu Lee, Daejeon (KR); Jong-Uk Hou, Daejeon (KR); Hak-Yeol Choi, Daejeon (KR); Hyun-Ji Song, Daejeon (KR); Do-Gon Kim, Daejeon (KR); Han-Ul Jang, Daejeon (KR)

(73) Assignee: KOREA ADVANCED INSTITUTE OF SCIENCE AND TECHNOLOGY, Daejeon (KR)

( * ) Notice: Subject to any disclaimer, the term of this patent is extended or adjusted under 35 U.S.C. 154(b) by 0 days.

(21) Appl. No.: 15/719,364

(22) Filed: Sep. 28, 2017

(65) Prior Publication Data
US 2018/0114289 A1    Apr. 26, 2018

(30) Foreign Application Priority Data

Oct. 20, 2016  (KR) .................. 10-2016-0136349
Jul. 13, 2017  (KR) .................. 10-2017-0088942

(51) Int. Cl.
*G06K 9/00* (2006.01)
*G06T 1/00* (2006.01)
(Continued)

(52) U.S. Cl.
CPC .............. *G06T 1/005* (2013.01); *B33Y 10/00* (2014.12); *G06F 21/10* (2013.01); *G06F 21/16* (2013.01);
(Continued)

(58) Field of Classification Search
CPC .. G06F 21/10; G06F 21/16; G06F 2221/0737; G06F 2201/0083; G06T 1/005; B33Y 10/00

See application file for complete search history.

(56) References Cited

U.S. PATENT DOCUMENTS 6,954,856 B1 * 10/2005 Kohashi ............... G06T 1/005
                                                   380/201
8,610,709 B2 * 12/2013 Choi .................... G06T 1/0028
                                                   345/419

(Continued)

FOREIGN PATENT DOCUMENTS

KR        10-0955201 B1    4/2010

OTHER PUBLICATIONS

Kim, M.S. et al. "Blind Watermarking for 3-D Mesh Sequence Using Temporal Wavelet Transform of Vertex Norms," with English abstract, *The Journal of Korean Institute of Communications and Information Sciences*, 2007, vol. 32, No. 3C, pp. 256-268.

*Primary Examiner* — Amara Abdi
(74) *Attorney, Agent, or Firm* — Fenwick & West LLP

(57) ABSTRACT

In a watermark embedding method and apparatus, a layered three-dimensional model is aligned in a printing direction based on a layering direction of the layered three-dimensional model. Then, a watermark having a predetermined pattern is embedded into the aligned three-dimensional model in a direction orthogonal to the printing direction so that the embedded watermark is not associated with the printing direction.

6 Claims, 12 Drawing Sheets

(51) Int. Cl.
*G06F 21/16* (2013.01)
*G06F 21/10* (2013.01)
*B33Y 10/00* (2015.01)

(52) U.S. Cl.
CPC .............. *G06F 2221/0737* (2013.01); *G06T 2201/0083* (2013.01)

(56) References Cited

U.S. PATENT DOCUMENTS

| | | | |
|---|---|---|---|
| 9,158,137 B1* | 10/2015 | Abbas | G02F 1/0123 |
| 2015/0066178 A1* | 3/2015 | Stava | B29C 64/386 |
| | | | 700/98 |
| 2015/0375455 A1* | 12/2015 | Williams | G06Q 10/10 |
| | | | 700/119 |
| 2016/0255237 A1* | 9/2016 | Misfeldt | H04N 1/32325 |
| | | | 428/201 |

* cited by examiner

WATERMARK EMBEDDING APPARATUS AND METHOD, AND WATERMARK DETECTING APPARATUS AND METHOD FOR 3D PRINTING ENVIRONMENT

CROSS-REFERENCE TO RELATED APPLICATION

This application is based on and claims priority to Republic of Korea Patent Application Nos. 10-2016-0136349 and 10-2017-0088942 filed on Oct. 20, 2016 and Jul. 13, 2017, respectively, the contents of which are incorporated herein by reference for all purposes.

TECHNICAL FIELD

The present disclosure relates to a watermark embedding apparatus, a watermark detecting apparatus, a watermark embedding method and a watermark detecting method. More particularly, the present disclosure pertains to a watermark embedding apparatus, a watermark detecting apparatus, a watermark embedding method and a watermark detecting method, which makes use of a blind-mesh watermarking technique robust against three-dimensional printing/scanning.

BACKGROUND

Along with the progress of a layered manufacturing technique also called a three-dimensional printing, the layered manufacturing technique has been used in various industrial fields. As the demand for a three-dimensional model increases, various sharing services appear in the web. As is the case in the precedent of MP3 and video markets, the increase of model sharing environments may pose a copyright problem for a three-dimensional printing environment model in the near future.

The three-dimensional model under a three-dimensional printing environment is available in a digital domain and has a special feature that the three-dimensional model is transformed into an analog form via a printing/scanning process. Therefore, the existing copyright protection techniques such as encryption, DRM and the like cannot be applied to an actually-printed three-dimensional model. A demand has existed for a copyright protection technique suitable for such a special situation.

There may be a situation that a three-dimensional model acquired by a three-dimensional scanner and released from copyright protection can be redistributed through the web or reproduced as an offline model via a three-dimensional printer. A three-dimensional watermark is a means for indicating a copyright by adding a human-unrecognizable distortion to a surface of a model and is a sole protection technique capable of maintaining copyright information even in a printing/scanning process.

The existing three-dimensional mesh watermarking is designed in conformity with different online applications and, therefore, has a problem in that it cannot operate in response to the distortion generated in a three-dimensional printing/scanning process. The distortions generated in a three-dimensional printing environment may be largely classified into three types. First of all, as shown in FIG. 1, a stair-step layering distortion is generated in a layered manufacturing process. Secondly, files and digital information including coordinate system information are all lost in a printing process. Lastly, various cuts and surface damages are generated in a scanning process.

Among the existing three-dimensional mesh watermarking methods, a non-blind method is very excellent in watermark detection performance because the non-blind method detects a watermark with reference to the information of an original model. However, it is necessary to refer to the information of an original model in order to detect a watermark. Therefore, the non-blind method is a quite impractical technique in that there is a need to build a database for a copyright-protected model.

Accordingly, a need has existed for a technique capable of detecting a watermark without referring to an original model.

SUMMARY

Embodiments of the present disclosure provide a blind mesh watermarking method and apparatus robust against three-dimensional printing/scanning, which is capable of detecting a watermark using a printing axis estimation technique without referring to an original model.

In accordance with an aspect, there is provided a watermark embedding method, including: a step of aligning a layered three-dimensional model in a printing direction based on a layering direction of the layered three-dimensional model; and a step of embedding a watermark having a predetermined pattern into the aligned three-dimensional model in a direction orthogonal to the printing direction so that the embedded watermark is not associated with the printing direction.

In the step of embedding the watermark, a coordinate system of the aligned three-dimensional model may be transformed into a cylindrical coordinate system and the watermark having the predetermined pattern may be embedded into a radius component of the three-dimensional model whose coordinate system is transformed into the cylindrical coordinate system.

In the step of embedding the watermark, the watermark having the predetermined pattern may be embedded by converting the watermark having the predetermined pattern into a spread spectrum signal and combining the spread spectrum signal with a sinusoidal signal formed of the radius component.

The method may further include a step of performing uniform re-meshing with respect to the three-dimensional model to make uniform a vertex distribution of the three-dimensional model.

In accordance with another aspect, there is provided a watermark detecting method, including: a step of acquiring a digital version of a layered three-dimensional model by scanning the layered three-dimensional model; a step of detecting periodicity of a layered noise pattern based on a predetermined manner by rotating the digital version at a predetermined angle; and a step of identifying a printing direction based on the periodicity of the layered noise pattern.

In the predetermined manner, the periodicity of the layered noise pattern may be detected by generating a plurality of projection images rotated at a predetermined angle and detecting a projection image whose layered noise pattern has periodicity, from the plurality of projection images, or the periodicity of the layered noise pattern may be detected by generating a plurality of surface images rotated at a predetermined angle and detecting a surface image whose layered noise pattern has periodicity, from the plurality of surface images.

The step of detecting the periodicity may determine that the layered noise pattern has periodicity when a peak value larger than a predetermined threshold value is detected at a specified period through frequency analysis.

The watermark detecting method may further include: a step of aligning the digital version in the identified printing direction; and a step of detecting a watermark embedded in the three-dimensional model based on the aligned digital version.

In the step of detecting the watermark, a coordinate system of the aligned digital version may be transformed into a cylindrical coordinate system and the embedded watermark is detected from a radius component of the digital version whose coordinate system is transformed into the cylindrical coordinate system.

The watermark detecting method may further include: a step of resampling vertex coordinates of the three-dimensional model at specified intervals.

In the step of detecting the watermark, if a spread spectrum watermark is embedded in the three-dimensional model, the embedded watermark may be detected using a frequency analysis algorithm and a correlation method for the aligned digital version.

In accordance with still another aspect, there is provided a watermark embedding apparatus, including: an alignment unit configured to align a layered three-dimensional model in a printing direction based on a layering direction of the layered three-dimensional model; and a processor configured to embed a watermark having a predetermined pattern into the aligned three-dimensional model in a direction orthogonal to the printing direction so that the embedded watermark is not associated with the printing direction.

The processor may transform a coordinate system of the aligned three-dimensional model into a cylindrical coordinate system and embed the watermark having the predetermined pattern into a radius component of the three-dimensional model whose coordinate system is transformed into the cylindrical coordinate system.

The processor may embed the watermark having the predetermined pattern by converting the watermark having the predetermined pattern into a spread spectrum signal and combining the spread spectrum signal with a sinusoidal signal formed of the radius component.

The processor may perform uniform re-meshing with respect to the three-dimensional model to make uniform a vertex distribution of the three-dimensional model.

In accordance with still further aspect, there is provided a watermark detecting apparatus, including: a three-dimensional scanner configured to acquire a digital version of a layered three-dimensional model by scanning the layered three-dimensional model; and a processor configured to detect periodicity of a layered noise pattern based on a predetermined manner by rotating the digital version at a predetermined angle, wherein the processor identifies a printing direction based on the periodicity of the layered noise pattern.

In the predetermined manner, the periodicity of the layered noise pattern may be detected by generating a plurality of projection images rotated at a predetermined angle and detecting a projection image whose layered noise pattern has periodicity, from the plurality of projection images, or the periodicity of the layered noise pattern may be detected by generating a plurality of surface images rotated at a predetermined angle and detecting a surface image whose layered noise pattern has periodicity, from the plurality of surface images.

The processor may determine that the layered noise pattern has periodicity when a peak value larger than a predetermined threshold value is detected at a specified period through frequency analysis.

The processor may align the digital version in the identified printing direction and detects a watermark embedded in the three-dimensional model based on the aligned digital version.

The processor may transform a coordinate system of the aligned three-dimensional model into a cylindrical coordinate system and detects the embedded watermark from a radius component of the digital version whose coordinate system is transformed into the cylindrical coordinate system.

The processor may resample vertex coordinates of the three-dimensional model at specified intervals.

In the watermark detecting apparatus, if a spread spectrum watermark is embedded in the three-dimensional model, the processor may detect the embedded watermark using a frequency analysis algorithm and a correlation method for the aligned digital version.

As set forth above, according to the various embodiments of the present disclosure, it is possible for the watermark embedding apparatus and method to embed a highly robust and visually unidentifiable watermark regardless of reproduction of a three-dimensional model.

Furthermore, it is possible for the watermark detecting apparatus and method to easily estimate a printing direction of a layered-manufacturing-method-based three-dimensional model.

Furthermore, it is possible for the watermark detecting apparatus and method to detect a watermark using a printing axis estimation method without referring to an original model. The watermark detecting apparatus and method does not require separate hardware or a special material and may be applied to a layered-manufacturing-method-based printer.

Furthermore, the watermark embedding apparatus, the watermark detecting apparatus, the watermark embedding method and the watermark detecting method may strengthen the copyright protection of three-dimensional model contents by providing a three-dimensional mesh watermarking technique robust against both a three-dimensional printing environment and an online environment.

In addition, the watermark embedding apparatus, the watermark detecting apparatus, the watermark embedding method and the watermark detecting method may make it possible to produce high-quality contents by strengthening the copyright protection of three-dimensional model contents and protecting the right of a copyright holder.

DETAILED DESCRIPTION

Figure 1:
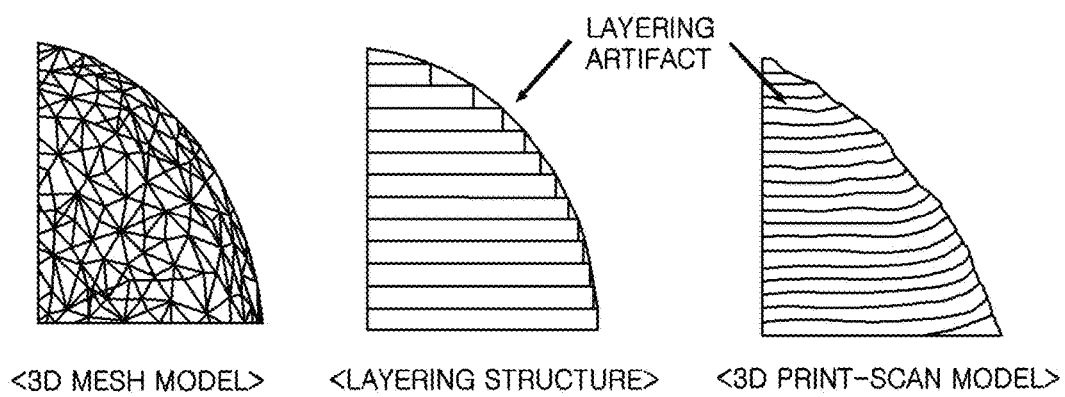
FIG. 1 is an exemplary view showing an original mesh model and a layered noise generated in a digital slicing process for a manufacturing process and in a layering process.

Hereinafter, configurations and operations of embodiments will be described in detail with reference to the accompanying drawings. The following description is one of various aspects of the present disclosure and may form a part of the detailed description of the present disclosure.

However, in describing the present disclosure, detailed descriptions of known configurations or functions that make the present disclosure obscure may be omitted.

The present disclosure may be variously modified and may include various embodiments. Specific embodiments will be exemplarily illustrated in the drawings and described in the detailed description of the embodiments. However, it should be understood that they are not intended to limit the present disclosure to specific embodiments but rather to cover all modifications, similarities, and alternatives which are included in the spirit and scope of the present disclosure.

The terms used herein, including ordinal numbers such as "first" and "second" may be used to describe, and not to limit, various components. The terms simply distinguish the components from one another.

When it is said that a component is "connected" or "linked" to another component, it should be understood that the former component may be directly connected or linked to the latter component or a third component may be interposed between the two components.

A "module" or "unit" for a component used herein may perform at least one function or operation. The "module" or "unit" may perform the function or operation by software, hardware or a combination of the software and the hardware. A plurality of "modules" or "units" may be integrated in at least one module. An expression used in the singular encompasses the expression of the plural, unless it has a clearly different meaning in the context.

Figure 2:
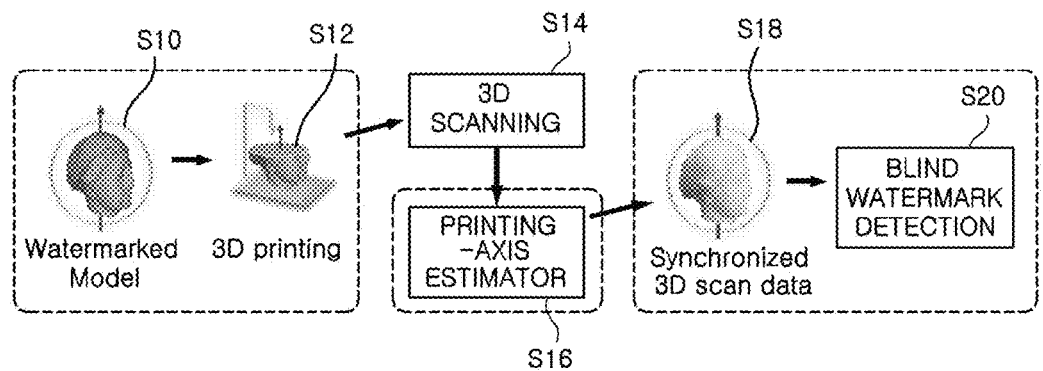
FIG. 2 is a view explaining a watermarking technique according to one embodiment of the present disclosure.

FIG. 2 is a view explaining a watermarking technique according to one embodiment of the present disclosure.

Referring to FIG. 2, the watermarking technique includes a process of embedding a watermark into a three-dimensional model, a process of estimating a printing direction or a printing reference axis for a digital version of a three-dimensional model scanned by a three-dimensional scanner, and a process of detecting a watermark embedded in a three-dimensionally printed model.

The embedding of a watermark into a three-dimensional model may be performed in the following manner. In one embodiment, a watermark embedding apparatus aligns a three-dimensional model in a printing direction based on a layering direction of a layered three-dimensional model. Then, the watermark embedding apparatus embeds a watermark having a predetermined pattern into the three-dimensional model in a direction perpendicular to the printing direction so that the watermark is not associated with the printing direction. In some cases, the watermark embedding apparatus may simultaneously perform the three-dimensional printing and the watermark embedding. The watermark embedding apparatus may determine an axis direction for printing a three-dimensional model (S10) and may print a three-dimensional model while embedding a watermark having a predetermined pattern in a direction perpendicular to the printing direction (S12).

A three-dimensional model having an embedded watermark (a watermarked model) may be generated by the process of embedding the watermark into the three-dimensional model. The watermark may be embedded based on the printing direction or the printing reference axis of a three-dimensional printer. As an example, a spread spectrum watermark may be embedded in a direction perpendicular to the printing direction. The watermark may be generated by a separate watermark key. The watermark may include mutually different patterns that can be classified on a person-by-person basis or on a group-by-group basis.

The watermark detecting apparatus may detect the watermark embedded in the three-dimensional model. The watermark detecting apparatus may perform a process of estimating a printing axis and a process of detecting the watermark embedded in the three-dimensionally printed model.

The process of estimating the printing axis may be performed in the following manner. In one embodiment, the watermark detecting apparatus acquires a digital version by scanning the three-dimensional model as a watermark detection target printed by a three-dimensional printer, using a three-dimensional scanner (S14). Then, the watermark detecting apparatus may estimate a printing direction or a printing reference axis of the three-dimensional model using the digital version thus acquired (S16).

In the process of estimating the printing direction, the printing direction of the digital version acquired by the three-dimensional scanning may be estimated by analyzing the layered noise appearing on the surface of the digital version.

The watermark detecting apparatus may perform a watermark detecting process after the process of estimating the printing direction. The watermark detecting apparatus may align the digital version in the estimated printing direction (S18) and then may detect (blind-detect) the watermark embedded in the three-dimensional model based on the aligned digital version (synchronized 3D scan data) (S20).

In order to detect the pattern of the watermark embedded in the model acquired under a three-dimensional printing environment, it is necessary to first restore the coordinate system into which the watermark is embedded (watermark synchronization). In the present disclosure, the layered noise pattern appearing on the model surface (the object surface or the digital version surface) is used for the restoration (synchronization) of the watermark without embedding additional information or changing the model. The layered noise pattern appears in a direction perpendicular to the printing direction. Therefore, if the watermark pattern is embedded in the direction perpendicular to the printing direction, the coordinate system of the embedded watermark pattern can be restored by analyzing the layered noise pattern. Needless to say, the present disclosure is not limited to the watermark being embedded only in the direction perpendicular to the printing direction. It may be possible to use all the watermark embedding methods and the watermark detecting methods in which the watermark is embedded based on the printing direction.

The configuration of the watermark embedding apparatus and the watermark detecting apparatus will be described below.

Figure 3:
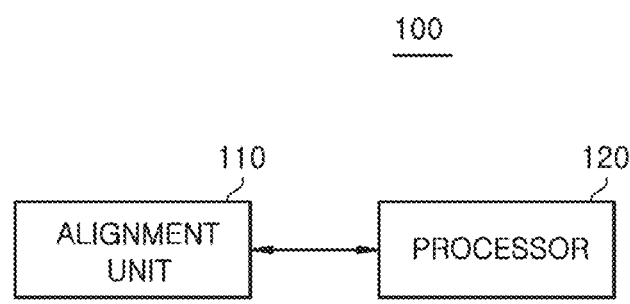
FIG. 3 is a block diagram of a watermark embedding apparatus according to one embodiment of the present disclosure.

FIG. 3 is a block diagram of the watermark embedding apparatus according to one embodiment of the present disclosure.

Referring to FIG. 3, the watermark embedding apparatus 100 includes an alignment unit 110 and a processor 120.

The alignment unit 110 aligns the three-dimensional model in the printing direction based on the layering direction of the layered three-dimensional model. The watermark described in the present disclosure may be embedded in the direction perpendicular to the printing direction so as to have a resistance against the layered noise. Thus, the watermark embedding apparatus 100 may identify the printing direction of the three-dimensional model and may align the three-dimensional model so that the printing direction is perpendicular to the floor surface.

The processor 120 embeds a watermark having a predetermined pattern into the three-dimensional model in a direction orthogonal to the printing direction so that the watermark is not associated with the printing direction. In general, the three-dimensional printer generates a three-dimensional model by a layering method. Thus, a noise is generated in each layer of the printed three-dimensional model in a direction parallel to the printing direction, whereby the embedded data may be lost. Accordingly, the data embedded in a direction parallel to the printing direction may be lost or may be unidentifiable due to the reproduction of the three-dimensional model. On the other hand, the watermark pattern set in a direction orthogonal to the printing direction is not affected by the layered noise generated in the direction parallel to the printing direction. Thus, the watermark pattern may not be lost and may be identified by the reproduction of the three-dimensional model.

The processor 120 may transform the coordinate system of the aligned three-dimensional model into a cylindrical coordinate system and may embed a watermark having a predetermined pattern into the radius component of the three-dimensional model transformed into the cylindrical coordinate system. When a spread spectrum watermark is embedded in the three-dimensional model, the processor 120 converts the watermark having a predetermined pattern into a spread spectrum signal and combines the spread spectrum signal with a sinusoidal signal formed of a radius component, which makes it possible to embed the watermark having a predetermined pattern.

Furthermore, the processor 120 may perform uniform re-meshing with respect to the three-dimensional model in order to make uniform the vertex distribution of the three-dimensional model. The watermark detecting method according to the present disclosure is a technique related to blind watermarking that does not use a reference three-dimensional model. In general, the vertex for three-dimensional printing is not uniform. Therefore, if the vertex information of the generated three-dimensional model is unknown, the watermark detecting apparatus may have a difficulty in detecting an embedded watermark. Therefore, in order to enable the watermark detecting apparatus to detect a watermark even in a state in which there is no information, the processor 120 of the watermark embedding apparatus may perform uniform re-meshing to make uniform the vertex distribution of the three-dimensional model.

The technique of embedding a watermark into a pre-generated three-dimensional model has been described hereinabove. However, the watermark embedding apparatus 100 may simultaneously perform the three-dimensional printing and the watermark embedding. For example, the watermark embedding apparatus 100 may be a three-dimensional printer. The alignment unit 110 may determine the printing direction. The processor 120 may perform a three-dimensional model printing process and may embed a predetermined watermark based on the determined printing direction.

Figure 4:
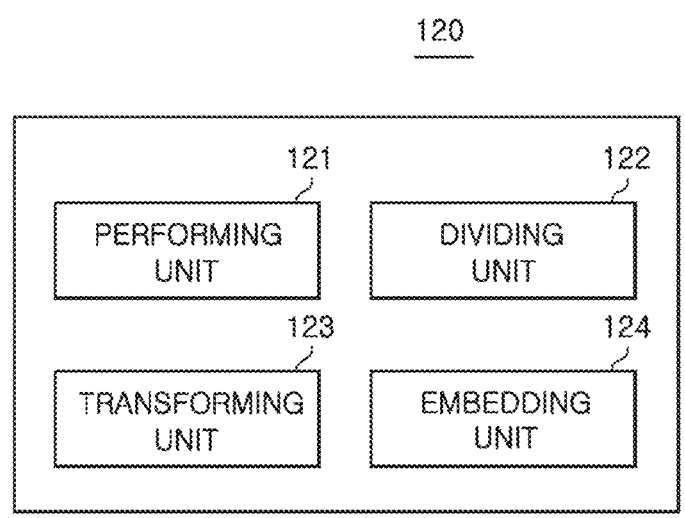
FIG. 4 is a block diagram of a processor of a watermark embedding apparatus according to one embodiment of the present disclosure.

FIG. 4 is a block diagram of the processor of the watermark embedding apparatus according to one embodiment of the present disclosure.

Referring to FIG. 4, the processor 120 of the watermark embedding apparatus according to the present disclosure may include a performing unit 121, a dividing unit 122, a transforming unit 123, and an embedding unit 124.

The performing unit 121 may perform uniform re-meshing with respect to the three-dimensional model into which a watermark is to be embedded. The dividing unit 122 may divide the three-dimensional model aligned in the printing direction into a plurality of predetermined slices. The watermark embedding apparatus 100 may divide the three-dimensional model into a plurality of slices and may embed a predetermined watermark into each of the divided slices. Therefore, when the watermark embedding apparatus 100 divides the three-dimensional model into a plurality of slices and embeds a watermark into each of the slices, the dividing unit 122 may divide the three-dimensional model into a plurality of slices. The dividing unit 122 may divide the three-dimensional model aligned in the printing direction, on the basis of the printing direction of the three-dimensional printer.

The transforming unit 123 may transform the coordinate system of the three-dimensional model aligned in the printing direction into a cylindrical coordinate system. Then, the embedding unit 124 may embed a predetermined watermark into the three-dimensional model aligned in the printing direction. The embedding unit 124 may embed a watermark into each of the divided slices. Specifically, the embedding unit 124 may embed a watermark into a radius component of each of the slices whose coordinate system is transformed into a cylindrical coordinate system. For example, the watermark may be identification information from which the three-dimensional model can be identified. The identification information may include a type of a printing device, user information, an IP address, an MAC address, a user history, specific information of a model, and so forth.

In one embodiment, the performing unit 121, the dividing unit 122, the transforming unit 123 and the embedding unit 124 may be realized as hardware modules or software modules.

While not illustrated in FIGS. 3 and 4, the watermark embedding apparatus 100 according to the present disclosure may have all operations and functions for a watermark detection process. That is to say, the watermark embedding apparatus and the watermark detecting apparatus may be physically consolidated into one apparatus. A specific watermark embedding process will be described in detail below.

Figure 5:
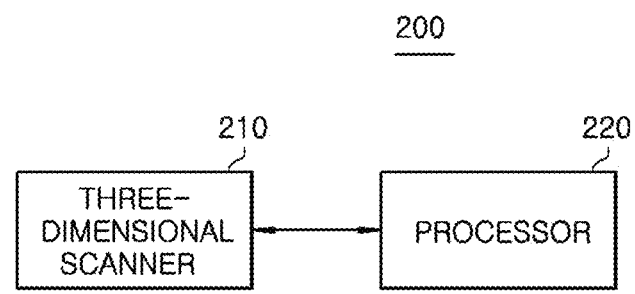
FIG. 5 is a block diagram of a watermark detecting apparatus according to one embodiment of the present disclosure.

FIG. 5 is a block diagram of the watermark detecting apparatus according to one embodiment of the present disclosure.

Referring to FIG. 5, the watermark detecting apparatus 200 includes a three-dimensional scanner 210 and a processor 220.

The three-dimensional scanner 210 acquires a digital version by three-dimensionally scanning a layered three-dimensional model. In some cases, the watermark detecting apparatus 200 may detect an embedded watermark using a three-dimensional digital version scanned by a separate three-dimensional scanner 210.

The processor 220 generates a plurality of projection images by rotating the acquired digital version at a predetermined angle. Then, the processor 220 detects a projection image whose layering image pattern has periodicity, from the plurality of projection images thus generated. Subsequently, the processor 220 identifies a printing direction based on the layered noise pattern having periodicity included in the projection image. The processor 220 may determine that the layered noise has periodicity, when a peak value larger than a preset threshold value is detected at a specified period by frequency analysis. Through the aforementioned process, the processor 220 may identify a printing direction (or a reference axis direction) of a three-dimensional model. Alternatively, a generating unit 221 shown in FIG. 6 may generate a plurality of surface images in place of the plurality of projection images so that a printing direction can be estimated. The process of estimating the printing direction using the plurality of surface images is the same as the process of estimating the printing direction using the plurality of projection images. Therefore, detailed description thereof will be omitted.

Meanwhile, the printing direction may be estimated in another way. In one embodiment, the watermark detecting apparatus 200 rotates the three-dimensional model. Then, the watermark detecting apparatus 200 performs a filtering process for the detection of a specific signal (e.g., a printing trace) from the surface of the rotating three-dimensional model. The watermark detecting apparatus 200 analyzes the output values of the filtering process thus performed. The watermark detecting apparatus 200 may identify the alignment direction of the model having a maximum value among the analyzed output values as a printing direction.

Alternatively, the watermark detecting apparatus 200 may generate a digital slicing model by performing a digital slicing process with respect to a three-dimensional model. Then, the watermark detecting apparatus 200 may scan the three-dimensional model. The watermark detecting apparatus 200 may identify a printing direction by analyzing the correlation between the generated digital slicing model and the scanned model. In other words, the watermark detecting apparatus 200 may identify the alignment direction of the model having a maximum correlation as a printing direction.

The processor 220 may align a digital version in the identified printing direction. Then, the processor 220 may detect the watermark embedded in the three-dimensional model, based on the digital version thus aligned.

Meanwhile, the watermark may be embedded after the coordinate system of the watermark is transformed into a cylindrical coordinate system in the watermark embedding apparatus. The processor 220 may transform the coordinate system of the aligned digital version into a cylindrical coordinate system and may detect the embedded watermark from the radius component of the digital version whose coordinate system is transformed into a cylindrical coordinate system.

The watermark detecting apparatus 200 according to the present disclosure may identify the watermark embedded in the three-dimensional model without using a reference three-dimensional model. Accordingly, the watermark detecting apparatus 200 may detect the embedded watermark after resampling the vertex coordinates of the three-dimensional model at regular intervals.

In the case where a spread spectrum watermark is embedded in a three-dimensional model, the processor 220 may detect an embedded watermark using a frequency analysis algorithm and a correlation method for the aligned digital version.

Figure 6:
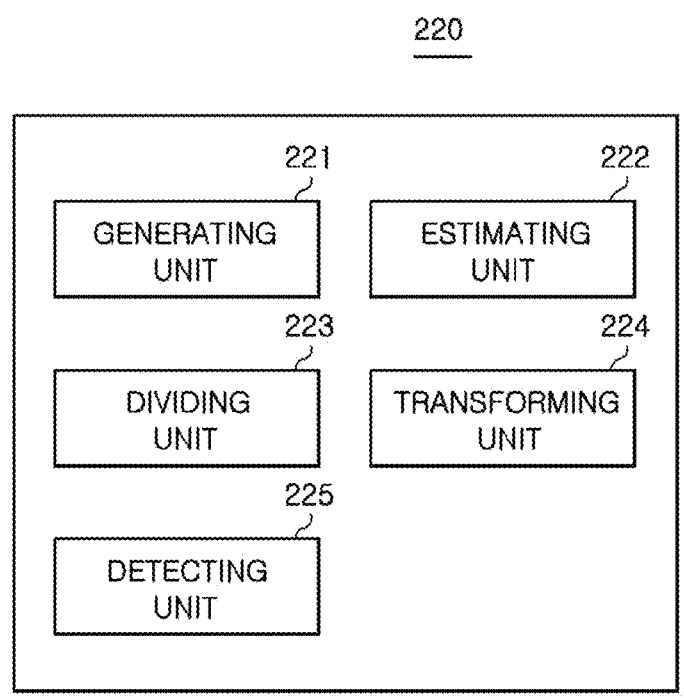
FIG. 6 is a block diagram of a processor of a watermark detecting apparatus according to one embodiment of the present disclosure.

FIG. 6 is a block diagram of the processor of the watermark detecting apparatus according to one embodiment of the present disclosure.

Referring to FIG. 6, the processor 220 of the watermark detecting apparatus may include a generating unit 221, an estimating unit 222, a dividing unit 223, a transforming unit 224 and a detecting unit 225.

The generating unit 221 may generate a plurality of projection images by rotating the acquired digital version at a predetermined rotation angle.

The estimating unit 222 may estimate the printing direction of the digital version based on the layered noise pattern of the digital version. The estimating unit 222 may estimate the printing direction of the digital version based on the layered noise pattern for the plurality of projection images. For example, the estimating unit 222 may detect a projection image whose layering image pattern has periodicity, from the plurality of projection images thus generated. In one embodiment, the estimating unit 222 may determine that the layered noise has periodicity, when a peak value larger than a preset threshold value is detected at a specified period by frequency analysis. The estimating unit 222 may estimate a printing direction based on the layered noise pattern having periodicity included in the projection image. Then, the estimating unit 222 may align the digital version to correspond to the printing direction, based on the estimated printing direction. As described above, the processor 220 of the watermark detecting apparatus may estimate the printing direction using surface images in place of projection images and may align the digital version.

In one embodiment, the watermark embedding apparatus may divide a three-dimensional model into a plurality of slices and may embed a predetermined watermark into each of the divided slices. When the watermark embedding apparatus embeds a watermark into each of the divided slices, the dividing unit 223 may divide the digital version aligned in the estimated printing direction into a plurality of predetermined slices.

The transforming unit 224 may transform the coordinate system of the digital version aligned in the printing direction into a cylindrical coordinate system. The detecting unit 225 may detect the watermark embedded in the three-dimensional model, based on the digital version aligned in the printing direction. The detecting unit 225 may detect the watermark embedded in the three-dimensional model from each of the divided slices. The detecting unit 225 may also detect the watermark embedded in the three-dimensional model from the radius component of the slices whose coordinate system is transformed into a cylindrical coordinate system. In the case where a spread spectrum watermark is embedded in a three-dimensional model, the detecting unit 225 may detect the watermark embedded in the three-dimensional model using a frequency analysis algorithm and a correlation method for the digital version aligned in the printing direction.

In one embodiment, the generating unit 221, the estimating unit 222, the dividing unit 223, the transforming unit 224 and the detecting unit 225 may be realized as hardware modules or software modules.

As described above, the watermark detecting apparatus 200 according to the present disclosure may have all operations and functions for a watermark embedding process. That is to say, the watermark embedding apparatus and the watermark detecting apparatus may be physically consolidated into one apparatus. A specific watermark detection process will be described in detail below.

First, the process of detecting a printing direction will be described.

FIGS. 7A to 11B are views explaining the process of detecting a printing direction according to one embodiment of the present disclosure. The printing direction of a three-dimensional model refers to an axial direction. Thus, the detection of a printing direction means the detection of an axial direction.

The watermarking technique according to the present disclosure may start from the intuitive and simple theorem that "the three-dimensional printing distortion in a rotating projection system may be construed as line segments having periodicity". A completely new input variable estimating method may be provided by applying various signal processing techniques to the projection data of a three-dimensional model.

Figure 7A:
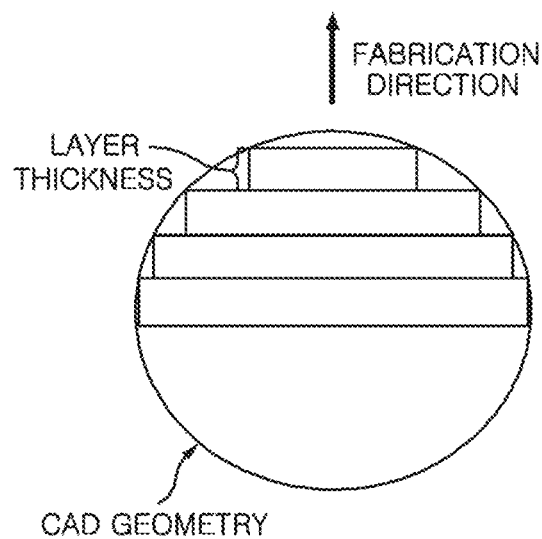
FIGS. 7A to 11B are views explaining a process of detecting a printing direction according to one embodiment of the present disclosure.

For the purpose of layered manufacturing, a three-dimensional printer sets input information (parameters) such as a layer thickness, a fabrication direction, a printing size, a position and the like. Based on the input information, the three-dimensional model as a digital image may be divided into horizontal thin layers as shown in FIG. 7A. The stair-step effect generated in this process is a distortion inevitably generated in a layered manufacturing process.

Figure 7B:
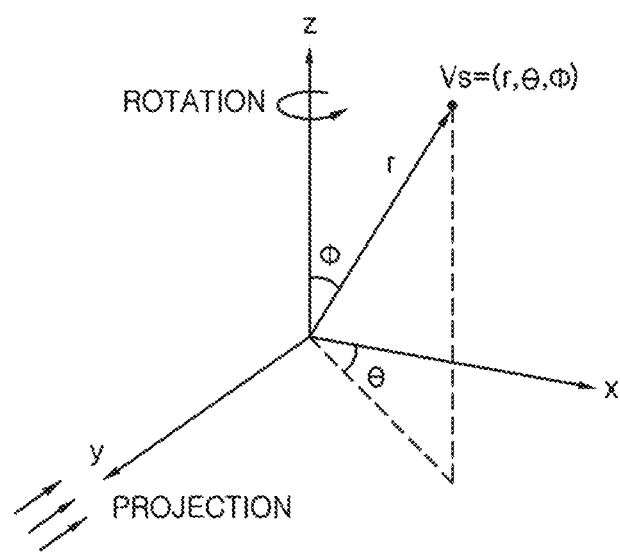

In the present disclosure, the stair-step effect is analyzed using a projection/rotation system (method or apparatus) as shown in FIG. 7B. That is to say, a projection system having a rotation space shown in FIG. 7B may be defined to analyze a three-dimensional model. The y axis indicates a projection direction, and the space may be rotated about the z axis. An arbitrary plane (P ⊂ R3) within the system may be interpreted as a line at a specific rotation angle. The aforementioned theory can be proved through a characteristic of a plane which has a normal line vector obtained by applying rotational transformation for removal of θ to an arbitrary vector Va=(r, θ, φ) as shown in FIG. 7B.

Figure 8:
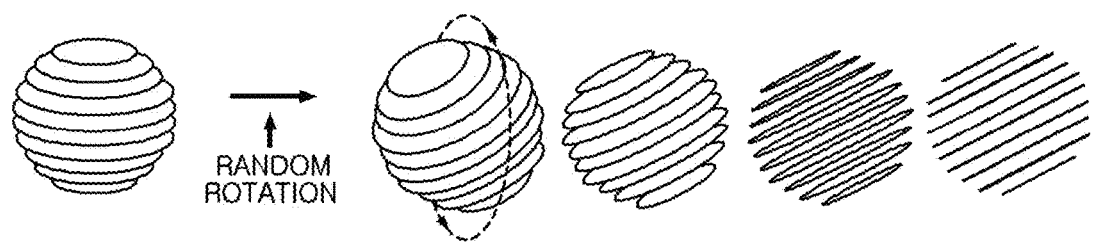

That is to say, as shown in FIG. 8, a plurality of layers manufactured by a layered manufacturing process may appear as lines at a specific rotation angle. In the present disclosure, the printing direction or the printing reference axis of the three-dimensional printer for printing the three-dimensional model as a watermark detection target may be estimated through the use of such a layered noise pattern.

It may be possible to design an algorithm for estimating the printing direction of a layered three-dimensional model (layering artifact) using the projection system. First, digitized three-dimensional surface data may be acquired by a three-dimensional scanner in order to analyze the surface of a three-dimensional model. In a pretreatment step, the center of scanned data M may be located at the center of mass. The scanned data M may be a digital version. The reference axis may be estimated through the processes of rotation, projection, amplification, frequency analysis, and axis estimation.

First, a rotation/projection process may be performed. The scanned data M of the three-dimensional model may be rotated about the z axis at a predetermined angle which falls within a range of 0 to 180 degrees. A model $M_\theta$ rotated at θ degrees may be generated as shown in FIG. 10B. The model $M_0$ may be projected onto the x-z plane shown in FIG. 7B, whereby a thickness map $P_\theta$ is acquired.

Figure 9:
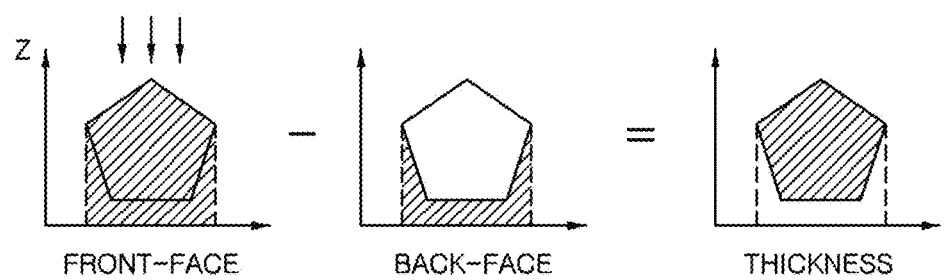

FIG. 9 is a view explaining a process of calculating a thickness. The thickness of the model $M_\theta$ may be calculated by subtracting a back-face depth map from a front-face depth map. The front-face depth map $P_f$ may be calculated by a z buffer algorithm. The z axis of the model $M_\theta$ may be invalidated, and the back face may be subjected to rendering in order to obtain a depth map $P_b$. Then, a thickness map $P_\theta$ may be acquired by subtracting $P_b$ from $P_f$.

Next, an amplification process may be performed. Various filtering techniques may be applied to highlight a periodic characteristic in a layered three-dimensional model. A high-pass filter may be applied to the thickness map $P_\theta$ to expose a trace of a layered three-dimensional model. Alternatively, a similar result may be obtained by quadratic differential or a Laplace operator. There has been found a histogram thresholding operation that has an effect of removing some meaningless components from the filtered thickness map $P_\theta$. In the present disclosure, two opposite operations, i.e., a histogram stretching operation and a histogram thresholding operation are used. The histogram thresholding operation may be defined by the following equation.

$$P'_\theta(x, y) = \begin{cases} 0.5 - \tau & \text{if } P_\theta(x, y) < 0.5 - \tau, \\ 0.5 + \tau & \text{if } P_\theta(x, y) > 0.5 + \tau, \\ P_\theta(x, y) & \text{otherwise,} \end{cases} \quad (1)$$

In this equation, τ denotes a threshold value, and (x, y) denotes an $x^{th}$ low and an $y^{th}$ column. The histogram stretching operation and the histogram thresholding operation are sequentially applied to the thickness map $P_\theta$, whereby an amplified thickness map $P'_\theta$ may be acquired.

Next, a frequency analysis process may be performed. In the case where the inputted scanned data is a layered manufacturing model, the three-dimensional model has especially strong periodicity. A layered three-dimensional model may be expressed in the form of periodic lines via an analysis performed using two-dimensional discrete Fourier transformation.

First, a Hanning window may be applied to the amplified thickness map $P'_\theta$ in order to prevent spectral leakage. Then, two-dimensional fast Fourier transformation may be performed and a magnitude may be calculated as follows.

$$F_\theta(u,v) = H(|\mathcal{F}(P'_\theta(x,y))|) \quad (2)$$

In this equation, u and v are frequency variables for x and y, F(·) is two-dimensional fast Fourier transformation, and H(·) is a Butterworth high-pass filter. The amplitude $F_\theta(u, v)$ and the polar coordinate system $F_\theta(r, \varphi)$ satisfy the following equation.

$$\begin{cases} r = \sqrt{u^2 + v^2}, \\ \varphi = \arctan(v/u) \end{cases} \quad (3)$$

In this equation, r and φ denote a radius and angular coordinates, respectively.

A threshold-value-based peak detector may be used to search for a local maximum value candidate (an $n^{th}$ peak larger than a local average magnitude). Then, a set of locations) $P^\theta 0$ for a candidate peak may be acquired. A peak $\rho_\theta$ may be selected from the largest magnitude that satisfies the following equation.

$$\begin{cases} pos(\varrho_\theta) = (r_0, \varphi_0) = \underset{(r,\varphi)\in \mathcal{P}_0^\theta}{\mathrm{argmax}}(F_\theta(r, \varphi)), \\ mag(\varrho_0) = F_\theta(r_0, \varphi_0), \end{cases} \quad (4)$$

In this equation, θ denotes an angle ranging from 0 to 180 degrees, $P^\theta_0$ denotes a set of locations, pos denotes a position value of a peak $\rho_\theta$, mag denotes a magnitude value, pos($\rho_\theta$) denotes a maximum peak position from a rotated model $M_\theta$, and mag($\rho_\theta$) denotes a magnitude of a layered three-dimensional model.

Figure 10A:
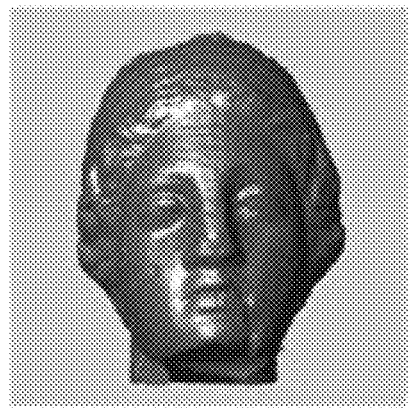
Figure 10B:
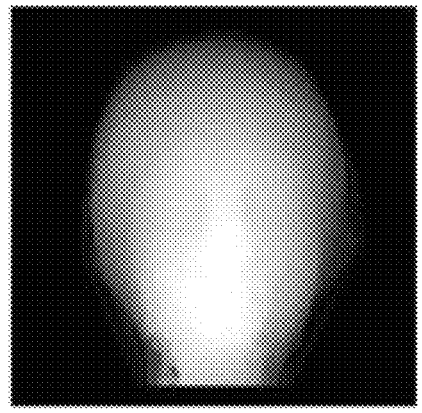
Figure 10C:
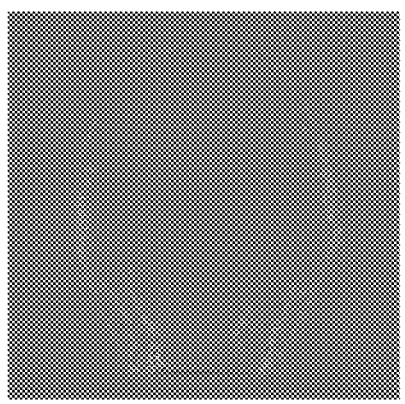
Figure 10D:
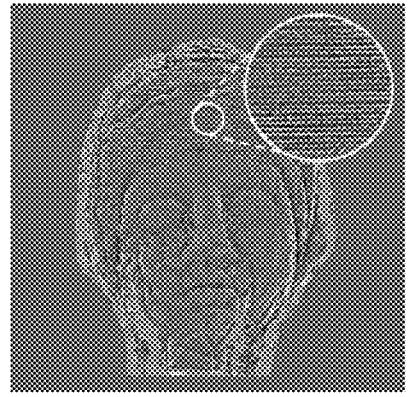

FIGS. 10A to 10D are views showing the respective input variable estimation processes. FIG. 10A shows the surface information data of an input model. FIG. 10B shows a thickness map $P_\theta$ of a projection image. FIG. 10C shows a thickness map $P_\theta$ processed by a high-pass filter. FIG. 10D shows a final result after filtering.

Figure 11A:
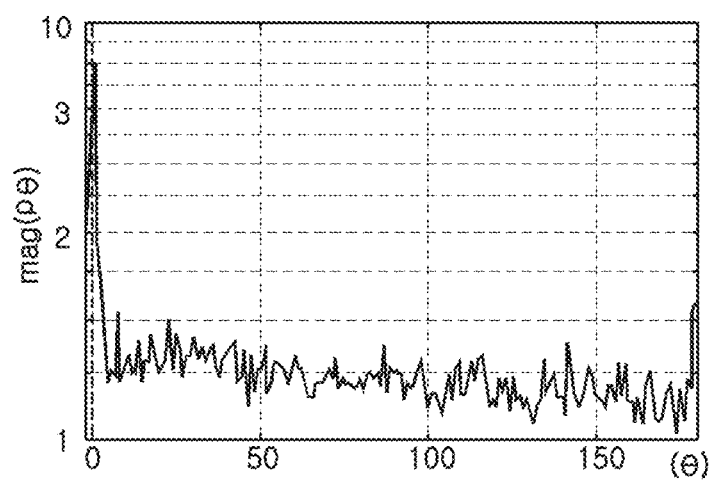
Figure 11B:
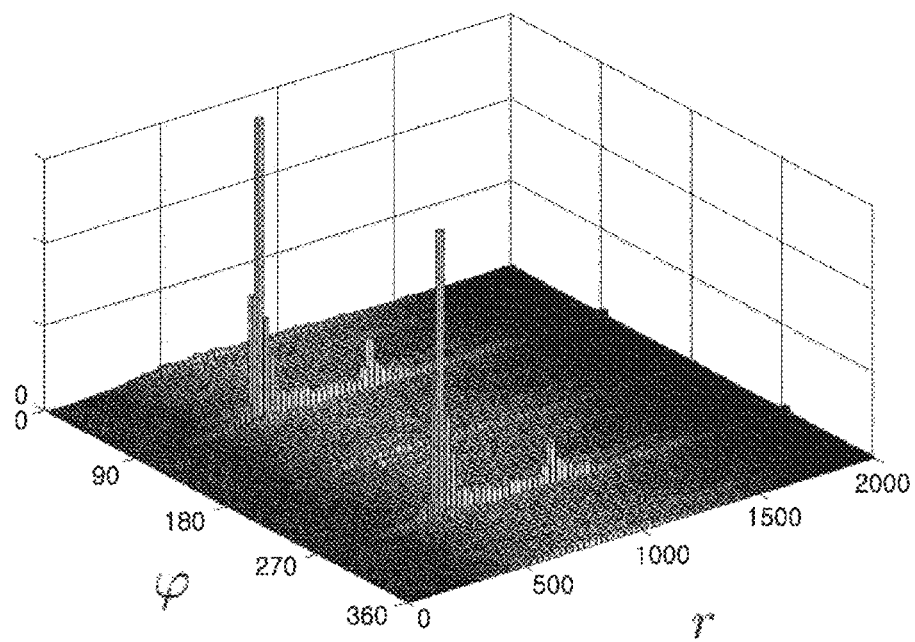

Next, the direction of a layered three-dimensional model may be estimated. FIGS. 11A and 11B show sample plots of $F_\theta(r, \varphi)$ for an estimated parameter $\hat{\theta}$. Periodic energy converges on a local point, and a global maximum point of $F_\theta(r, \varphi)$ may be estimated. That is to say, in the axis estimation method, it is determined that the projection image has periodicity, when a peak value larger than a predetermined threshold value is detected at a specified period through frequency analysis.

Specifically, a process of estimating a printing direction or a printing reference axis of a three-dimensional printer, which prints a three-dimensional model, from a projection data through periodicity analysis will be described. The watermark detecting apparatus first acquires a magnitude map $F_\theta(u, v)$ by performing a two-dimensional Fourier transformation with respect to a projection data $M_\theta(m, n)$ for a rotation angle θ. The watermark detecting apparatus transforms the magnitude map $F_\theta(u, v)$ into a polar coordinate system $F_\theta(r, \varphi)$ and, then, sorts out local peaks (or candidate peaks) using a threshold-value-based peak detector. Subsequently, the watermark detecting apparatus selects a peak $\rho_\theta$ having a largest value from the local peaks and, then, estimates through substitution a layering direction (or a printing direction) $u_a=(1, \theta, \varphi)$ in which a three-dimensional model is printed. If a peak is not detected, the watermark detecting apparatus may determine that the three-dimensional model is not manufactured by a layering method.

In order to reduce the axis estimation time, the aforementioned axis estimation method may be performed by sampling a part of the scanned data.

Next, a watermark embedding process will be described.

FIGS. 12A to 12C and 13A and 13B are views explaining a watermark embedding process according to one embodiment of the present disclosure.

Figure 12A:
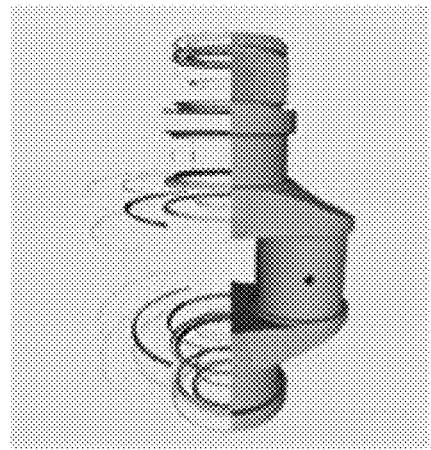
FIGS. 12A to 12C and 13A and 13B are views explaining a watermark embedding process according to one embodiment of the present disclosure.

In the watermark embedding method according to one embodiment of the present disclosure, when a three-dimensional model as a watermark embedding target is inputted, uniform re-meshing may be performed with respect to the inputted three-dimensional model. Then, the three-dimensional model subjected to the uniform re-meshing may be rotated and aligned in the printing direction of the three-dimensional printer. The uniform re-meshing refers to a process of resampling the surface of an inputted three-dimensional model, i.e., a mesh model as shown in FIG. 12A. The uniform re-meshing may make uniform the vertex distribution on the surface of the three-dimensional model.

Figure 12B:
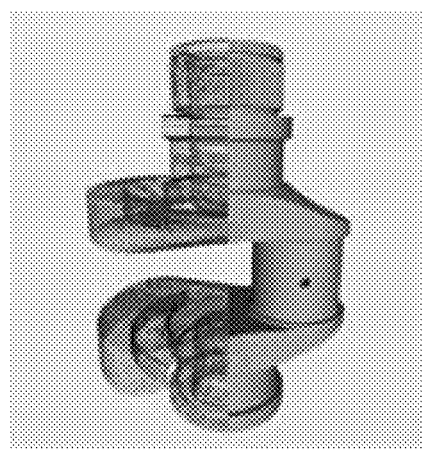

The right half in FIG. 12A shows a mesh model resampled for the sake of convenience in description. The actually inputted mesh model may be expressed by dots and lines as in the left half of FIG. 12A. The three-dimensional model subjected to the uniform re-meshing may be resampled by making uniform the vertex distribution on the surface of the three-dimensional model as shown in FIG. 12B. By resampling the mesh model and embedding the watermark, the watermark detecting apparatus may detect a watermark without information on a reference three-dimensional model.

Figure 12C:
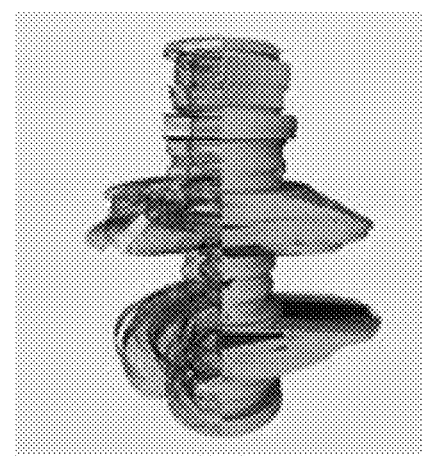

The watermark embedding apparatus may rotate and align the rotary drive mechanism 15 subjected to the uniform re-meshing in the printing direction. Alternatively, the watermark embedding apparatus may include a three-dimensional printer. The watermark embedding apparatus may align the three-dimensional model in the printing direction and may print the three-dimensional model in the aligned direction. The three-dimensional model shown in FIG. 12B may be rotated and aligned in the printing direction as shown in FIG. 12C.

After the three-dimensional model is aligned in the printing direction of the three-dimensional printer, the three-dimensional model aligned in the printing direction may be divided into a plurality of predetermined slices. The watermark embedding apparatus may divide the three-dimensional model, which is aligned on the basis of the printing direction of the three-dimensional printer or on the basis of the printing reference axis, into the slices. For example, the three-dimensional model shown in FIG. 12C may be divided into a predetermined number of slices layered in a vertical direction. The center of each of the slices thus divided may be shifted about the printing reference axis.

After the three-dimensional model is divided into the slices, the coordinate system information on the three-dimensional model aligned in the printing direction is transformed into a cylindrical coordinate system. A watermark may be embedded in the radius component (ρ) of the slices whose coordinate system is transformed into the cylindrical coordinate system. A watermark pattern may be generated using a watermark key. On the other hand, the watermark embedding apparatus may not transform the coordinate system into a cylindrical coordinate system and may embed a watermark in a Descartes coordinate system (orthogonal coordinate system) using x and y coordinates. In addition, the watermark embedding apparatus may embed watermarks into all the slices or may embed a watermark into at least one slice in a specific region.

The watermark embedding apparatus may transform the coordinate system of the three-dimensional model into a cylindrical coordinate system in order to embed a watermark into the radius component of the slices and may embed a watermark into the radius component of the vertex of the three-dimensional model having a cylindrical coordinate system. In addition, the watermark embedding apparatus may embed a spread spectrum watermark into the radius component of each of the slices.

The watermark embedding may be explained by the following equation.

$$p'_i = p_i + \alpha(v_i) \cdot \Psi(\varphi_i), \quad (5)$$

In this equation, i is an index of a vertex and is represented by $1 \geq i \geq v$. $\alpha(\cdot)$ is a function for visual masking. $\Psi$ is a spread spectrum signal and may be combined with a sinusoidal signal in a frequency band [fs+1, fs+lw] by the following equation.

$$\Psi(\varphi_i) = \sum_{m=1}^{l_w} w_m \cdot \sin(2\pi\varphi_i(m + f_s) + \phi_{i,l}), \quad (6)$$

In this equation, $W_m$ denotes a watermark, $f_s$ denotes a minimum frequency band, $\Phi i,1$ denotes a minute phase parameter, and $(m+f_s)$ denotes a frequency.

Figures 13A, 13B:
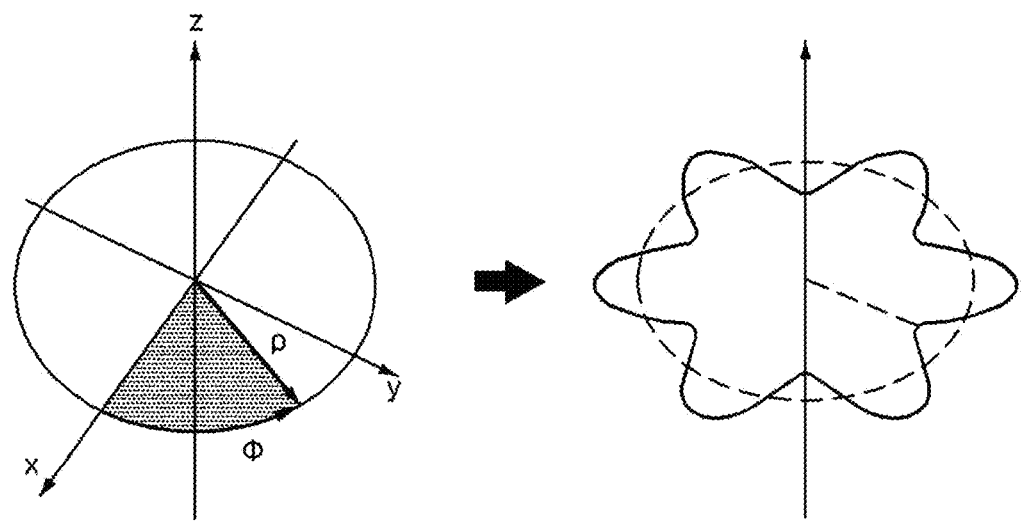

Conceptually describing, one slice (or one layer) of the three-dimensional model printed by a three-dimensional printer is shown in FIG. 13A. The watermark embedding apparatus may embed a watermark of a predetermined pattern generated by a watermark key into one slice (or one layer). In FIG. 13B, there is shown one slice (or one layer) into which a watermark is embedded. As shown in FIG. 13B, the watermark embedded in the radius component of the three-dimensional model is not visible and may have a resistance against a layered noise. Accordingly, even if the three-dimensional model is reproduced, the watermark embedded in the radius component may be maintained.

The watermark embedding method according to the present disclosure is not limited to the method of embedding the watermark into the radius component of the cylindrical coordinate system but may include various methods capable of embedding a watermark. In the watermark embedding method according to the present disclosure, the three-dimensional model may be aligned in the printing direction of the three-dimensional printer and, then, the watermark may be embedded in the three-dimensional model aligned in the printing direction.

As described above, in the watermark embedding method according to the present disclosure, the watermark may be embedded in the three-dimensional model aligned in the printing direction of the three-dimensional printer, on the basis of the printing direction or on the basis of the printing reference axis in many different ways.

The watermark embedding method has been described above. A watermark detecting method will be described below.

In the watermark detecting method according to the present disclosure, a printed version of the three-dimensional mesh model protected by a watermark may be required to detect a watermark. Basically, the watermark detecting method may be performed in the reverse order of the watermark embedding method.

As shown in FIG. 2, the watermark detecting method according to one embodiment of the present disclosure may be performed in the order of a three-dimensional model scanning process, a printing direction (reference axis) identifying process, a coordinate system transforming process, a watermark detecting process and a detected response signal analyzing process.

A three-dimensional scanner acquires a digital version of a three-dimensional model by three-dimensionally scanning the surface of the three-dimensional model printed by the three-dimensional printer. That is to say, the three-dimensional scanner digitizes the surface information of the three-dimensional model printed by the three-dimensional printer. For example, the three-dimensional scanner acquires a digital version of the three-dimensional model shown in FIG. 10A by three-dimensionally scanning the surface of the three-dimensional model. As described above, the three-dimensional scanner may be a component included in the watermark detecting apparatus. Alternatively, the three-dimensional scanner may be an independent device which is separate from the watermark detecting apparatus. The watermark detecting apparatus may perform a watermark detecting process by receiving the scanned data from the three-dimensional scanner.

After the digital version of the three-dimensional model is acquired, the watermark detecting apparatus may generate a plurality of projection images for the digital version by rotating the acquired digital version at a predetermined rotation angle and may calculate a thickness map of each of the projection images. For example, the watermark detecting apparatus may generate the projection images by rotating the digital version shown in FIG. 10A about an arbitrary specific axis at all the rotation angles $\theta$ and may generate a thickness map $P_\theta$ of the projection images. The thickness map of the projection images may be generated or acquired by projecting the thickness information of the three-dimensional model (or the digital version thereof) on a two-dimensional plane.

After the thickness map of the projection images is generated, the watermark detecting apparatus may estimate the printing direction of the digital version based on the layered noise pattern of the projection images. For example, as shown in FIGS. 10C and 10D, the watermark detecting apparatus may obtain a thickness map $P_\theta$ having an enhanced stair effect through a filtering process for the thickness map of all the projection images. Then, the watermark detecting apparatus may obtain a position of a peak on the analyzed data through the periodicity analysis of the thickness map $P_\theta$ of the projection data and may estimate the printing direction or the printing reference axis of the three-dimensional model as an input variable based on the position of the peak thus obtained. In this regard, the peak may correspond to $\theta$ and $\varphi$ in a spherical coordinate system for the thickness map $P_\theta$ having an enhanced stair effect.

Specifically, a process of estimating a printing direction or a printing reference axis of a three-dimensional printer, which prints a three-dimensional model, from a projection data through periodicity analysis will be described. The watermark detecting apparatus first acquires a magnitude map $F_\theta(u, v)$ by performing a two-dimensional Fourier transformation with respect to a projection data $M_\theta(m, n)$ for a rotation angle $\theta$. The watermark detecting apparatus transforms the magnitude map $F_\theta(u, v)$ into a polar coordinate system $F_\theta(r, \varphi)$ and, then, sorts out local peaks (or candidate peaks) using a threshold-value-based peak detector. Subsequently, the watermark detecting apparatus selects a peak $\rho_0$ having a largest value from the local peaks and, then, estimates through substitution a layering direction (or a printing direction) $u_a=(1, \theta, \varphi)$ in which a three-dimensional model is printed. If a peak is not detected, the watermark detecting apparatus may determine that the three-dimensional model is not manufactured by a layering method.

After the printing direction of the digital version is estimated, the watermark detecting apparatus may align the digital version in the estimated printing direction. The watermark detecting apparatus may align the digital version in the watermark embedding direction by aligning the axis of the digital version in the direction of the printing reference axis of the three-dimensional printer or in the printing direction.

The watermark detecting apparatus may divide the digital version aligned in the printing direction into a plurality of predetermined slices. If the watermark detecting apparatus is aware of the information that the embedded watermark is not divided into slices, the process of dividing the digital version into a plurality of slices may be omitted. The watermark detecting apparatus may divide the three-dimensional model, which is aligned on the basis of the printing direction of the three-dimensional printer or on the basis of the printing reference axis, into the slices.

After the digital version is divided into the slices, the watermark detecting apparatus may transform the coordinate system of the digital version aligned in the printing direction into a cylindrical coordinate system and may detect the watermark embedded in the three-dimensional model from the radius component (ρ) of each of the slices whose coordinate system is transformed into the cylindrical coordinate system.

The watermark detecting apparatus may resample the coordinate information of the vertex for the digital version into a pattern of a lattice having predetermined intervals. The coordinate information used at this time may be a z axis of the cylindrical coordinate system and a component φ.

In the case where a spread spectrum watermark is embedded in a three-dimensional model, the watermark detecting apparatus may detect the watermark embedded in the three-dimensional model using a frequency analysis algorithm and a correlation method for the digital version aligned in the printing direction.

The detection of the embedded watermark using the correlation method may be performed in the following process.

First, one-dimensional fast Fourier transformation is applied to the φ axis and the magnitude is calculated.

$$M(z, \xi_\varphi) = H(|\mathcal{F}(G(z,\varphi))|) \quad (7)$$

In this equation, F denotes one-dimensional fast Fourier transformation, and H denotes a high-pass filter.

Next, the magnitudes of the z axis are averaged in the following manner.

$$M'(\xi_\varphi) = \frac{1}{G_z} \sum_{z=1}^{G_z} M(z, \xi_\varphi) \quad (8)$$

A sub-vector M* is selected from M.

$$M^*(m) = M'(m+f_s) \quad (9)$$

In this equation, m is represented by $1 \geq m \geq l_w$ where $l_w$ denotes the length of the watermark. $f_s$ denotes a start frequency.

Next, the detection response r is calculated.

$$r = \text{corr}(w, M^*) = \frac{(w - \bar{w}) \cdot (M^* - \overline{M^*})}{\|w - \bar{w}\| \cdot \|M^* - \overline{M^*}\|} \quad (10)$$

In this equation, w denotes a watermark pattern.

The watermarking method according to the present disclosure may have the following advantages.

First, the synchronization information of the watermark may be restored using only the pattern generated in the three-dimensional printing process without using additional reference axis restoration information. All the industrial/popular models manufactured through a layered manufacturing process have a layered noise. Thus, the present disclosure may be applied to most of the existing models. Since an additional pattern required for the restoration of a watermark reference axis is not necessary, the present disclosure has a big advantage from the viewpoint of invisibility of the watermark.

Second, the watermark is embedded in the direction orthogonal to the printing axis. Therefore, the watermark may be robust to a digital slicing process performed before a layering process. In addition, the watermark pattern is not separated in a physical layering process. Therefore, the watermark may be robust against an offline printing noise.

Various embodiments for embedding a watermark and detecting the embedded watermark have been described above. Flowcharts of a watermark embedding method and a watermark detecting method will be described below.

Figure 14:
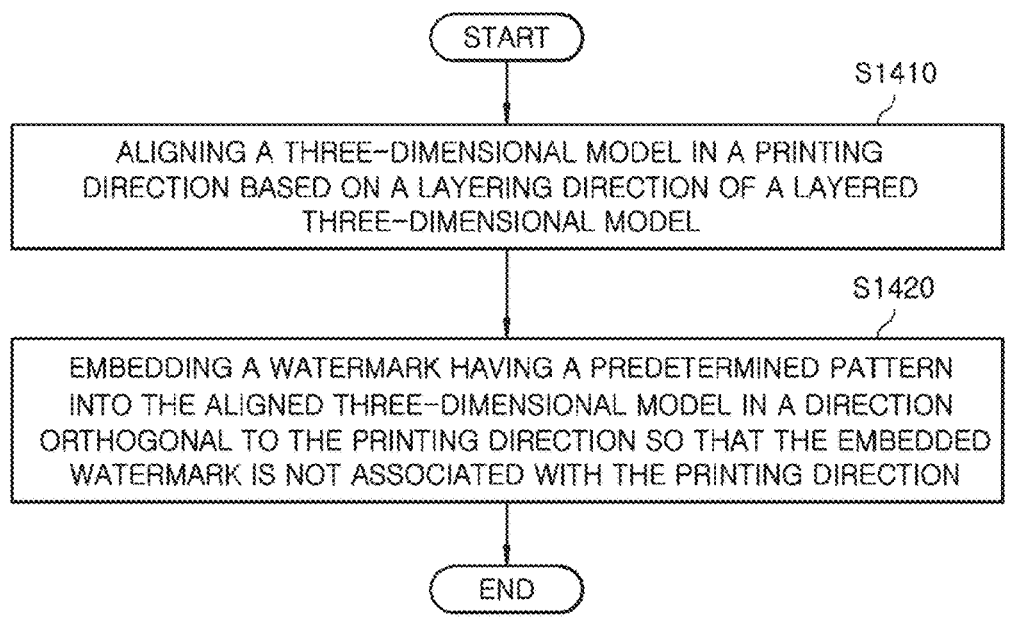
FIG. 14 is a flowchart showing a watermark embedding method according to one embodiment of the present disclosure.

FIG. 14 is a flowchart showing a watermark embedding method according to one embodiment of the present disclosure.

Referring to FIG. 14, the watermark embedding apparatus aligns a three-dimensional model in a printing direction based on a layering direction of a layered three-dimensional model (S1410). The printing direction of the three-dimensional model refers to a layering direction and a reference axis direction.

The watermark embedding apparatus may embed a watermark having a predetermined pattern into a three-dimensional model in a direction orthogonal to the printing direction so that the watermark is not associated with the printing direction (S1420). The watermark embedding apparatus may transform the coordinate system of the aligned three-dimensional model into a cylindrical coordinate system and may embed a watermark having a predetermined pattern into the radius component of the three-dimensional model whose coordinate system is transformed into the cylindrical coordinate system. On the other hand, the watermark embedding apparatus may not transform the coordinate system into a cylindrical coordinate system and may embed a watermark into x and y components on a Descartes coordinate system (orthogonal coordinate system).

Furthermore, the watermark embedding apparatus may perform a uniform re-meshing process with respect to the three-dimensional model to make uniform the vertex distribution of the three-dimensional model. In one embodiment, the watermark embedding apparatus may convert the watermark having a predetermined pattern into a spread spectrum signal and may combine the spread spectrum signal with a sinusoidal signal formed of a radius component, which makes it possible to embed the watermark having a predetermined pattern. The watermark embedding apparatus may include a three-dimensional printer and may perform the watermark embedding simultaneously with the printing of the three-dimensional model.

Figure 15:
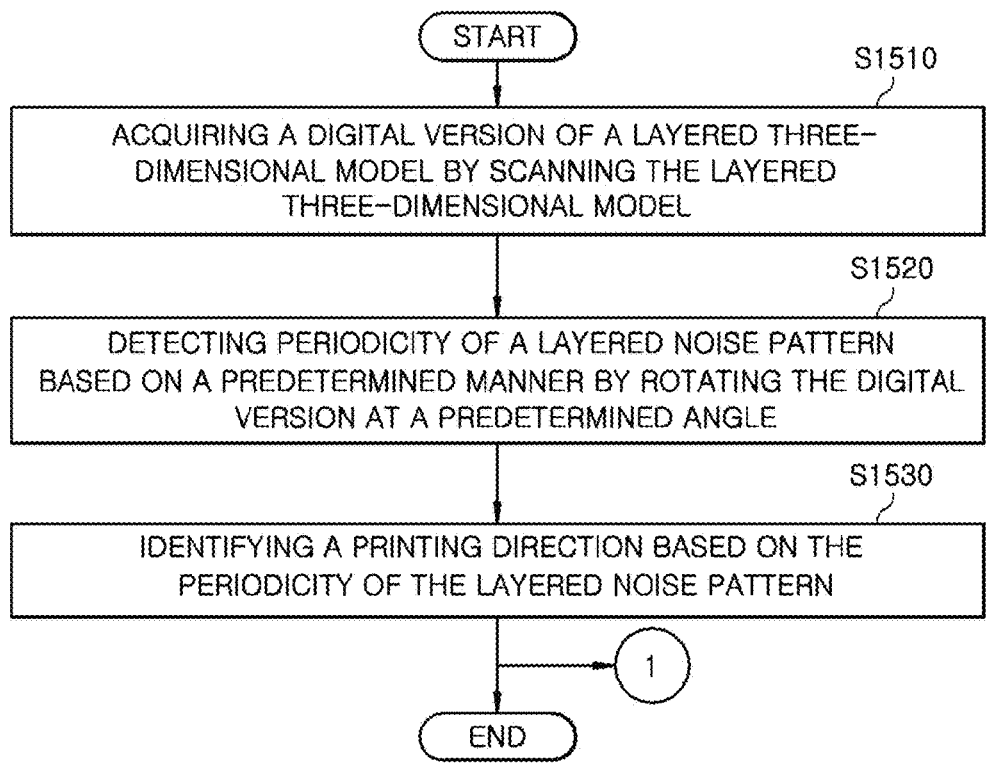
FIG. 15 is a flowchart showing a watermark detecting method according to one embodiment of the present disclosure.

FIG. 15 is a flowchart showing a watermark detecting method according to one embodiment of the present disclosure.

The watermark detecting apparatus may estimate a printing direction (or a reference axis direction) and may detect an embedded watermark.

Referring to FIG. 15, the watermark detecting apparatus acquires a digital version by three-dimensionally scanning a layered three-dimensional model (S1510). The watermark detecting apparatus may include a three-dimensional scanner and may scan the three-dimensional model. In some cases, the three-dimensional scanner may be an independent device, and the watermark detecting apparatus may receive a digital version data from the three-dimensional scanner.

The watermark detecting apparatus may detect the periodicity of a layered noise pattern based on a predetermined manner by rotating the acquired digital version at a predetermined angle (S1520). In general, the three-dimensional model is manufactured by a layering method. Thus, the acquired digital version may include a layered noise pattern. Accordingly, when a plurality of projection images is generated by rotating the digital version at a specified angle, the watermark detecting apparatus may identify a layered noise pattern from the projection images. For example, the watermark detecting apparatus may determine that the layered noise has periodicity, when a peak value larger than a preset threshold value is detected at a specified period by frequency analysis.

Meanwhile, the watermark detecting apparatus may sample and analyze a projection image data in order to reduce the time required in an axis estimation process and may determine the periodicity based on the projection image having largest periodicity.

The predetermined manner may include various methods. For example, a plurality of projection images rotated at a predetermined angle may be generated. The periodicity of a layered noise pattern may be detected by detecting a projection image whose layered noise pattern has periodicity, from the plurality of projection images thus generated. Alternatively, a plurality of surface images rotated at a predetermined angle may be generated and the periodicity of a layered noise pattern may be detected by detecting a surface image whose layered noise pattern has periodicity, from the plurality of surface images thus generated.

The periodicity of the layered noise pattern may be estimated in other ways. In one embodiment, the watermark detecting apparatus 200 rotates the three-dimensional model. Then, the watermark detecting apparatus 200 performs a filtering process for the detection of a specific signal (e.g., a printing trace) from the surface of the rotating three-dimensional model. The watermark detecting apparatus 200 analyzes the output values of the filtering process thus performed. The watermark detecting apparatus 200 may estimate that the layered noise pattern has periodicity, when the layered noise pattern has the maximum value among the analyzed output values. Alternatively, the watermark detecting apparatus 200 may perform a digital slicing process with respect to the three-dimensional model to generate a digital slicing model. Then, the watermark detecting apparatus 200 scans the three-dimensional model. The watermark detecting apparatus 200 may estimate the periodicity of the layered noise pattern by analyzing the correlation between the digital slicing model and the scanned model.

The watermark detecting apparatus 200 identifies a printing direction based on the detected periodicity of the layered noise pattern (S1530).

Figure 16:
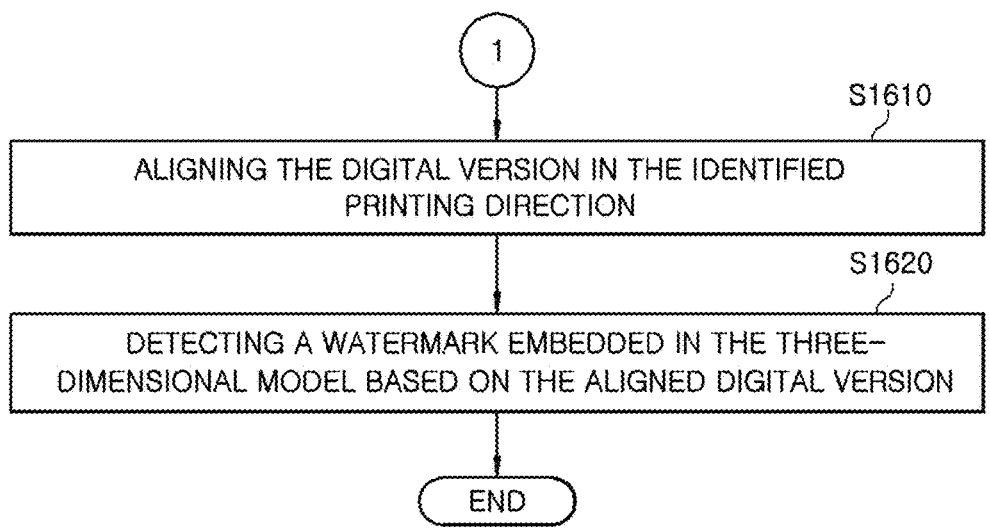
FIG. 16 is a flowchart showing a watermark detecting method according to another embodiment of the present disclosure.

FIG. 16 is a flowchart showing a watermark detecting method according to another embodiment of the present disclosure.

Referring to FIG. 16, the watermark detecting apparatus identifies a printing direction and then aligns a digital version in the identified printing direction (S1610). The watermark detecting apparatus detects a watermark embedded in a three-dimensional model based on the aligned digital version (S1620). The watermark detecting apparatus may transform the coordinate system of the aligned digital version into a cylindrical coordinate system and may detect the embedded watermark from the radius component of the digital version whose coordinate system is transformed into the cylindrical coordinate system. In addition, the watermark detecting apparatus may resample the vertex coordinates of the three-dimensional model at specified intervals.

In the case where a spread spectrum watermark is embedded in the three-dimensional model, the watermark detecting apparatus may detect the embedded watermark using a frequency analysis algorithm and a correlation method for the digital version. The correlation method has been described above and, therefore, will not be specifically described here.

The watermark embedding method or the watermark detecting method according to the various embodiments described above may be realized as a program. It may be possible to provide a non-transitory computer-readable medium that stores the program.

The non-transitory computer-readable medium does not refer to a medium such as a register, a cache memory or the like that stores a data for a short period of time, but refers to a medium capable of semi-permanently storing a data and capable of being read by a device. Specifically, the various applications or programs described above may be provided in a state in which they are stored in a non-transitory computer-readable medium such as a CD, a DVD, a hard disk, a Blu-ray disk, a USB, a memory card, a ROM or the like.

The various watermark embedding methods and watermark detecting methods described above may be may be used in many different ways. For example, the watermark embedding method and the watermark detecting method may be used as independent software either individually or in combination. Alternatively, the watermark embedding method and the watermark detecting method may be used as an accessary program of a three-dimensional model designing or editing program. Alternatively, the watermark embedding method and the watermark detecting method may be used as an accessary program of three-dimensional scanner control software. In the case where the watermark embedding method and the watermark detecting method are used as an accessary program, they may be realized in the form of firmware inside a desktop computer or a scanner. A watermark may be detected when a printed model is scanned. Alternatively, the watermark embedding method and the watermark detecting method may be used as an accessary program of a three-dimensional model sharing portal. When used as an accessary program of a three-dimensional model sharing portal, the watermark embedding method and the watermark detecting method may confirm an identification number embedded in a model when the model is uploaded.

A watermark may be embedded or detected in a smartphone using an Internet-of-things scanner for a smartphone or an augmented reality technique. A three-dimensional model may be captured using a smartphone application and a phone camera. Alternatively, a three-dimensional model may be captured using a two-dimensional or dual camera. A watermark may be detected using the captured three-dimensional model.

The watermark embedding method and the watermark embedding method according to the present disclosure may be used in many different embodiments. As a specific example, Alice may be a manufacturer and a copyright holder of a three-dimensional model. Bob may be a receiving person of a three-dimensional model. The three-dimensional model received by Bob may be leaked out by a third party. In the case of the aforementioned example, an existing digital security technique may be used. However, a three-dimensional model database needs to be constructed to detect a watermark using an existing non-blind method. The blind watermark detecting method according to the present disclosure does not require the construction of a three-dimensional model database. In the case of the aforementioned example, when a three-dimensional printing process is included in a distribution process, it is difficult to detect a watermark by an existing method. That is to say, when a three-dimensional model is distributed, shared, sold or reproduced using an online sharing platform or the like, if a watermark is embedded in an existing way, a protection object may disappear. However, if a watermark (or identification information) is embedded by the watermark embedding method according to the present disclosure, the identification information remains even if a three-dimensional model is reproduced through three-dimensional printing by a third party. Accordingly, in the case of the aforementioned example, if the watermark embedding method and the watermark detecting method according to the present disclosure are used, a model manufacturer may settle a copyright dispute for a three-dimensional model by confirming a watermark indicated on a surface of a digitally reproduced three-dimensional model.

In another embodiment, the three-dimensional model manufactured by Alice is digitally reproduced and is delivered to Bob. The reproduced model delivered to Bob may be leaked out as a printed model or a scanned model through at least one three-dimensional printing or three-dimensional scanning process. In general, the three-dimensional model may be distributed, shared or sold using an online sharing platform or the like. In the case where a protection device is embedded by an existing technique, the protection device may disappear if Bob prints the three-dimensional model. Alternatively, when the reproduction process of the three-dimensional model includes a three-dimensional scanning process, Bob may maliciously perform three-dimensional printing to remove digital identification information.

Accordingly, in the case of the aforementioned example, Alice may embed copyright holder identification information into the three-dimensional model before delivering the three-dimensional model to an online sharing platform or Bob. The copyright holder identification information may be embedded through a personal program of Alice or an editing program using the watermark embedding method according to the present disclosure. Alternatively, Alice may embed the identification information when uploading the three-dimensional model to an online sharing platform. Alternatively, the identification information may be embedded just before Bob downloads the three-dimensional model from an online sharing platform. If the identification information is embedded using the watermark embedding method according to the present disclosure, the identification information remains even when Bob uses three-dimensional printing. Accordingly, if a dispute occurs, the dispute may be settled by detecting the identification information embedded in the three-dimensional model.

In a further embodiment, the three-dimensional model printed by Alice may be delivered to Bob through an offline distribution process. Bob may leak out the printed three-dimensional model or may leak out a scanned digital model obtained by three-dimensionally scanning the three-dimensional model. In general, Alice may print a three-dimensional model and then may distribute, share or sell the printed three-dimensional model. However, the identification information embedded by an existing method may disappear when a three-dimensional model is three-dimensionally printed.

Accordingly, in the case of the aforementioned example, Alice may embed copyright holder identification information into a digital model before printing and then may print and distribute the digital model. Even if the three-dimensional model is distributed offline and reproduced by three-dimensional printing after it is printed, the watermark (or the identification information) embedded according to the present disclosure remains as it is. Thus, the watermark embedding method and the watermark detecting method are advantageous in preventing a copyright dispute or searching out an illegal distributor.

While the present disclosure has been described above using the preferred embodiments, the scope of the present disclosure is not limited to the specific embodiments described above. A person having ordinary knowledge in the relevant technical field will be able to replace or modify the constituent elements. Such replacement or modification should be construed to fall within the scope of the present disclosure.

What is claimed is:

1. A watermark embedding method, comprising:
   aligning a layered three-dimensional model in a printing direction based on a layering direction of the layered three-dimensional model; and
   embedding a watermark having a predetermined pattern into the aligned three-dimensional model in a direction orthogonal to the printing direction so that the embedded watermark is not associated with the printing direction,
   wherein in the embedding the watermark, the three-dimensional model aligned on the basis of the printing direction is divided into a plurality of slices, a coordinate system of the three-dimensional model is transformed into a cylindrical coordinate system, and the watermark having the predetermined pattern is embedded into a radius component of at least one of the slices whose coordinate system is transformed into the cylindrical system.

2. The method of claim 1, wherein in the embedding the watermark, the watermark having the predetermined pattern is embedded by converting the watermark having the predetermined pattern into a spread spectrum signal and combining the spread spectrum signal with a sinusoidal signal formed of the radius component.

3. The method of claim 1, further comprising:
   performing uniform re-meshing with respect to the three-dimensional model to make uniform a vertex distribution of the three-dimensional model.

4. A watermark embedding apparatus, comprising:
   an alignment unit configured to align a layered three-dimensional model in a printing direction based on a layering direction of the layered three-dimensional model; and
   a processor configured to embed a watermark having a predetermined pattern into the aligned three-dimensional model in a direction orthogonal to the printing direction so that the embedded watermark is not associated with the printing direction,
   wherein, in the embedding the watermark, the three-dimensional model aligned on the basis of the printing direction is divided into a plurality of slices, a coordinate system of the three-dimensional model is transformed into a cylindrical coordinate system, and the watermark having the predetermined pattern is embedded into a radius component of at least one of the slices whose coordinate system is transformed into the cylindrical system.

5. The apparatus of claim 4, wherein the processor embeds the watermark having the predetermined pattern by converting the watermark having the predetermined pattern into a spread spectrum signal and combining the spread spectrum signal with a sinusoidal signal formed of the radius component.

6. The apparatus of claim 4, wherein the processor performs uniform re-meshing with respect to the three-dimensional model to make uniform a vertex distribution of the three-dimensional model.

* * * * *